No. 803,583. PATENTED NOV. 7, 1905.
G. F. HALL.
CULTIVATING TOOL.
APPLICATION FILED JAN. 16, 1905.
4 SHEETS—SHEET 1.
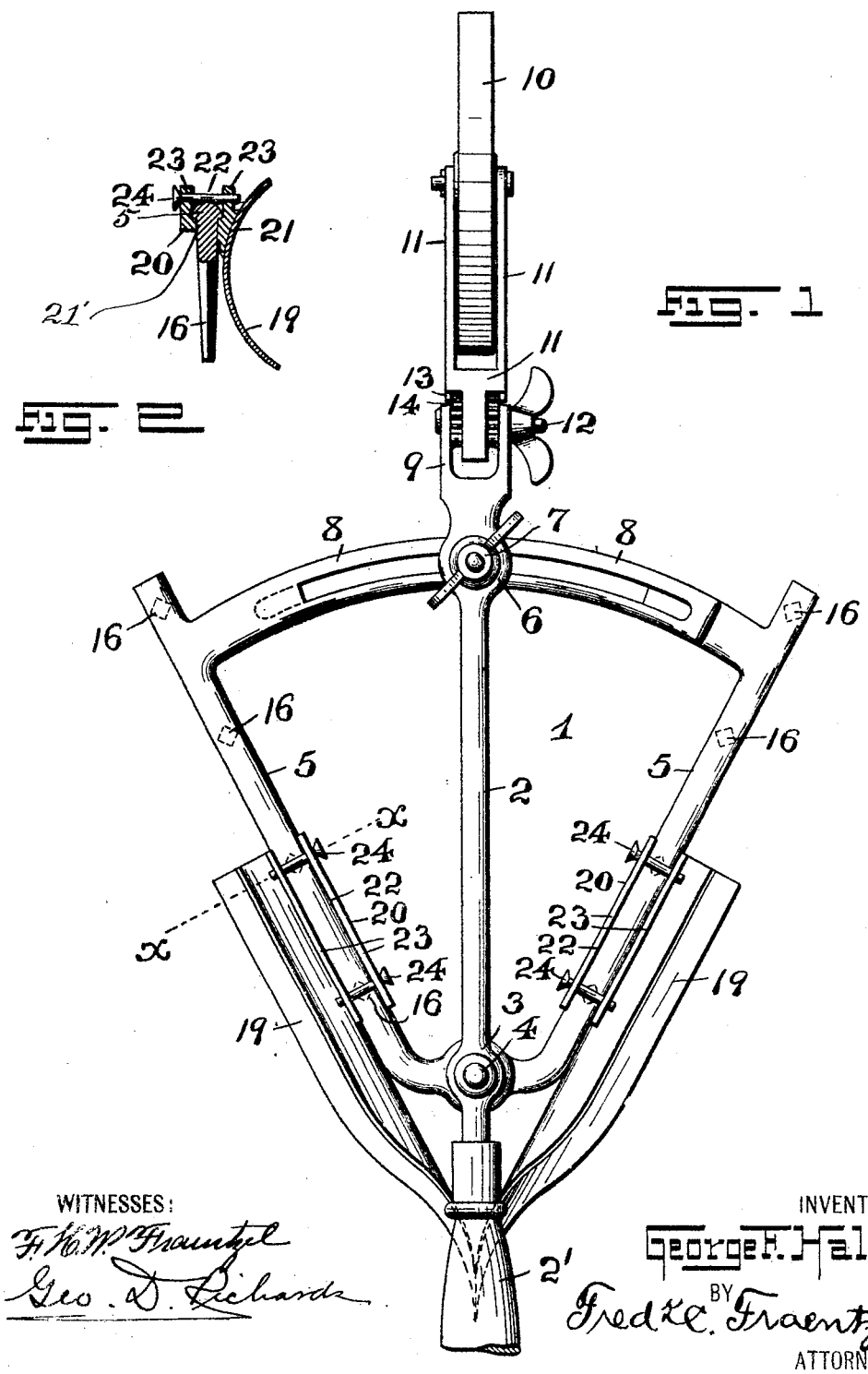

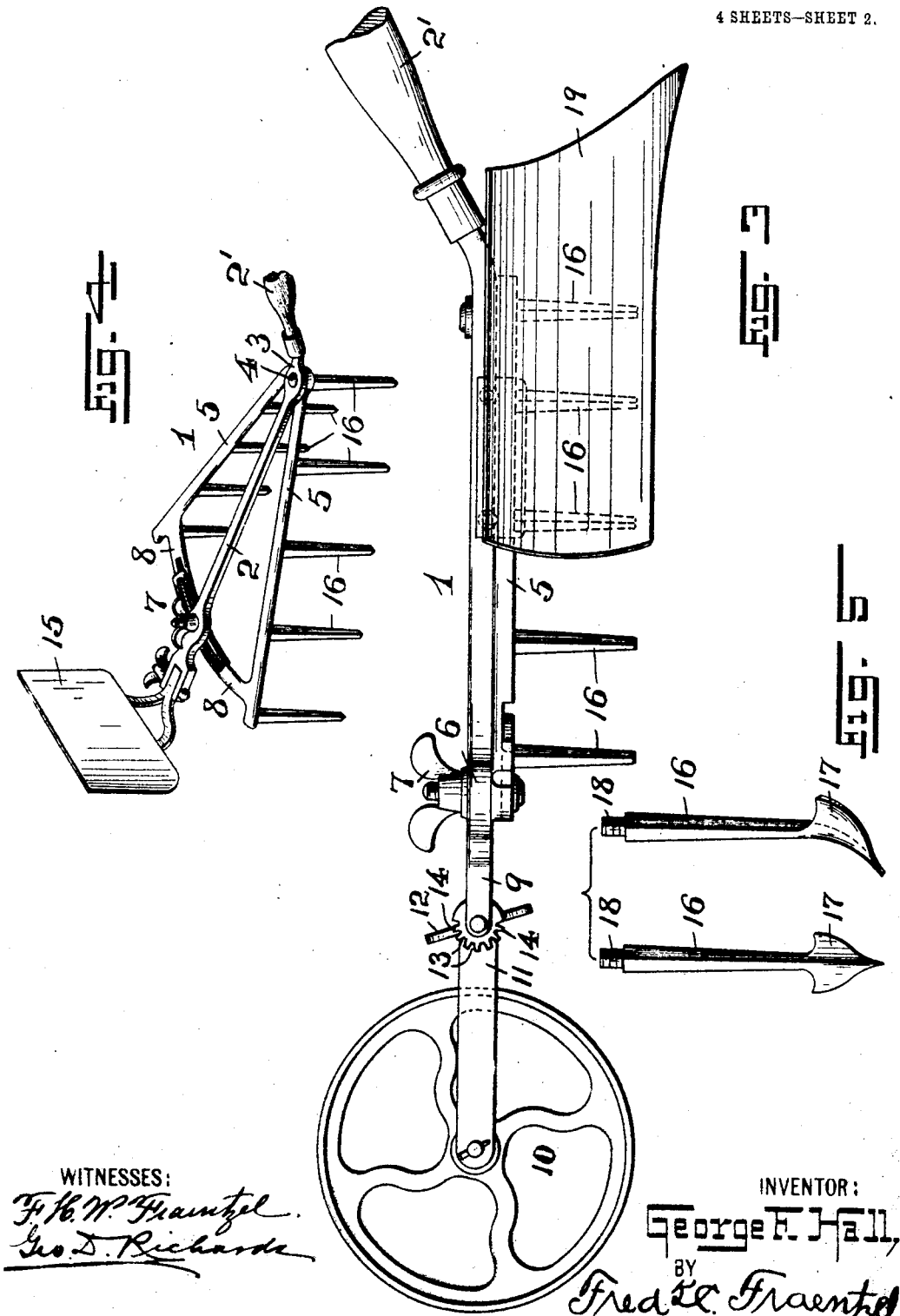

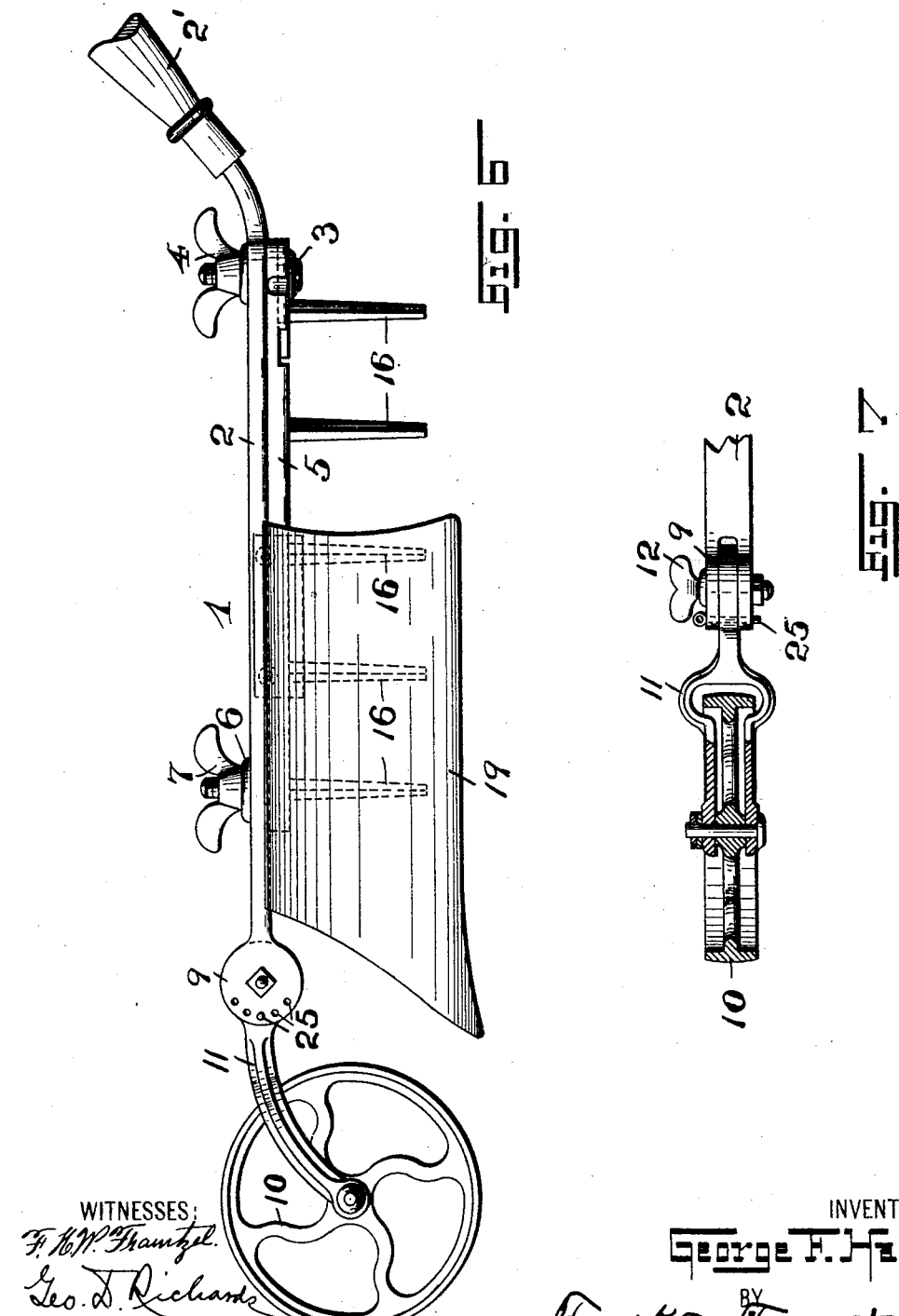

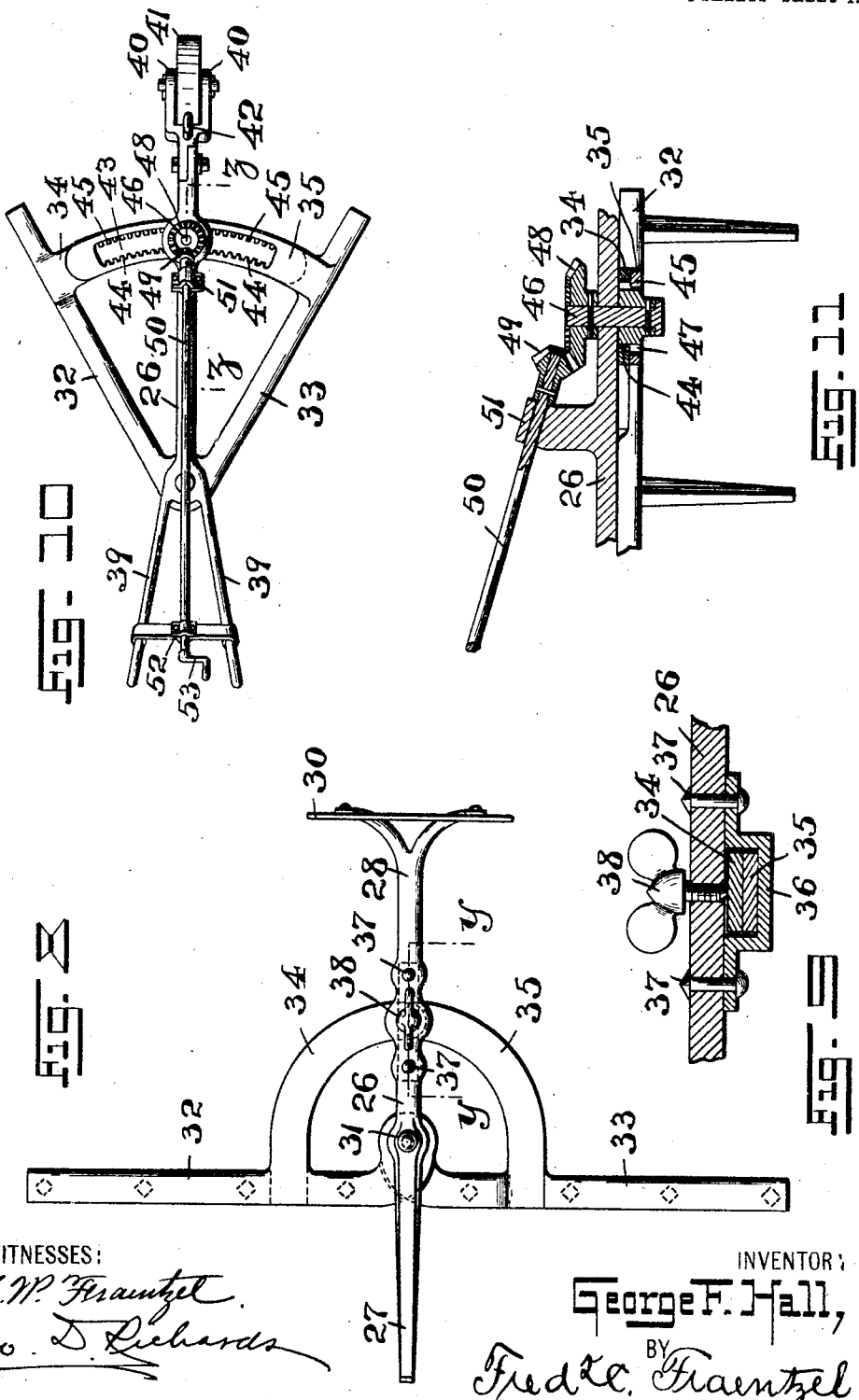

UNITED STATES PATENT OFFICE.

GEORGE F. HALL, OF JERSEY CITY, NEW JERSEY, ASSIGNOR TO LEO ALEXANDER, OF NEW YORK, N. Y.

CULTIVATING-TOOL.

No. 803,583.　　　　Specification of Letters Patent.　　　　Patented Nov. 7, 1905.

Application filed January 16, 1905. Serial No. 241,176.

*To all whom it may concern:*

Be it known that I, GEORGE F. HALL, a citizen of the United States, residing at Jersey City, in the county of Hudson and State of New Jersey, have invented certain new and useful Improvements in Cultivating-Tools; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My present invention has reference generally to improvements in gardening or cultivating tools or implements, and the principles of the invention are applicable to hand-cultivators and to other implements of a larger structure, but similar in character, such as harrows, which are drawn by horse in the cultivation of fields.

My invention has for its principal object to provide a simply and cheaply constructed tool or implement having pivotally and adjustably connected tooth or tine carrying members and a suitable locking means for easily securing the said members in variously adjusted positions; to provide an implement or tool by means of which furrows can be made in the ground of greater or less distances apart.

A further object of this invention is to provide a combination cultivating-tool having interchangeable parts adapted to be employed in connection with the cultivation of flowers and small garden vegetables, such as onions and the like, to secure extensibility of certain parts without reducing the strength of the device; to provide a cultivating-tool that can be easily worked by hand around and between the plants, and to secure other advantages and results, some of which will be referred to in connection with the description of the working parts.

Other objects of this invention are simplicity and cheapness of construction and ease of manipulation in setting the adjustable parts or members of the tool.

With these various objects of my invention in view the said invention consists, primarily, in the novel cultivating tool or implement hereinafter set forth; and, furthermore, this invention consists in the various arrangements and combinations of devices and parts, as well as in the details of the construction of said parts, all of which will be more fully described in the following specification and then finally embodied in the clauses of the claim, which are appended to and form an essential part of this specification.

The invention is clearly illustrated in the accompanying drawings, in which—

Figure 1 is a plan view of the improved cultivating implement or device. Fig. 2 is a detail section of the same, taken on line $x\ x$ in said Fig. 1. Fig. 3 is a side elevation of the cultivating implement. Fig. 4 is a perspective view illustrating a modified construction of the tool, and Fig. 5 illustrates certain cultivating-teeth which may be employed under certain conditions. Fig. 6 illustrates the reversibility of the center bar of the device, and Fig. 7 shows a preferred construction of wheel-carrier. Fig. 8 is a plan or top view of a cultivating-tool embodying the main features of this invention, but of a slightly-modified form of construction; and Fig. 9 is a vertical section on an enlarged scale, said section being taken on line $y\ y$ in said Fig. 8. Fig. 10 is a plan or top view of still another modified form of cultivating-tool to be drawn by horse and provided with means for bringing the tooth or tine carrying members in variously adjusted positions while the implement is being drawn along the ground; and Fig. 11 is a vertical section on an enlarged scale, said section being taken on line $z\ z$ in said Fig. 10.

Similar characters of reference are employed in the above-described views to indicate corresponding parts.

Referring now to the said figures of the drawings, the reference character 1 indicates a frame having a main center bar 2, at the one end of which the straight handle 2' is secured, the said bar and handle both lying in the longitudinal center line of the device and at obtuse angles vertically one to the other, the handle inclining upward to secure an easy hold and operation by the workman, as will be understood. Near the connection of the handle with the said center bar 2 the latter is provided with a pivot-bearing 3 to receive the pivot or rivet 4 on which the oppositely-inclined or flaring arms 5 5 of the frame are arranged, said arms working horizontally or in a plane approximately the plane of the center bar. At or near the forward end of the said center bar the same is provided with a bearing 6 for a clamp 7 or other form of arm-holding device, and the arms 5 5 are provided with segmental arms or members 8 8, which extend inward and across the center bar overlying one another, as indicated in Figs. 1 and 4. The segmental arms or members are slotted to receive the screw of the clamp, and the slots are curved in lines concentric with the pivot to allow lateral adjustment without removing said screw. At the forward extremity the center bar is forked, as at 9, or is otherwise provided with bearings for a removable part. This part is preferably a wheel 10, arranged in a carrier 11, adapted to be rigidly fixed in the forked extremity by a clamping-screw 12 or other device. The carrier and extremity may be reciprocally toothed and notched to prevent pivotal movement of the carrier on the frame 1, as indicated at 13 and 14 and as shown in Figs. 1 and 3 of the drawings.

In lieu of the wheel and its carrier I may employ a hoe 15, as indicated in Fig. 4, the hoe and wheel being interchangeable.

The frame 1, or preferably the inclined or flaring arms 5 thereof, are provided on the under side with cultivating-teeth 16. These teeth 16, when the said frame or parts 5 and 8 thereof are of cast metal, such as malleable iron, are preferably integral with the frame; but under other conditions the teeth may be independent pieces, as indicated in Fig. 5 of the drawings. They may be provided with shares or wings 17 to more thoroughly work the soil and with screw-threads 18 for attaching them in position upon the under sides of the arms 5. The teeth being in flaring series traverse over different paths through the soil when the implement is pushed or pulled over the ground, and thus the latter is thoroughly worked and freed from weeds.

Upon the frame 1 I arrange, when I desire to throw the dirt to one side upon or around the stem or roots of the plant, moldboards 19. These are preferably of sheet metal and are brought together at a point, so as to enter the ground and lift the dirt and then, because of the flaring sides of the boards or plates, throws it away from the center of the implement. The said boards are separable from the frame and are held thereon in the manner illustrated in Figs. 1 and 2, where 20 20 indicate metal castings or cleats secured upon the inner sides of the shares by rivets or other means, said cleats being curved on their outer faces, as at 21, (see Fig. 2,) to engage the convex surfaces of the shares. On their upper faces the castings are recessed or grooved, as at 22, to receive the arms 5, and below said grooves the castings are perforated, as at 21', to receive the cultivating teeth or tines of the arms 5, said teeth or tines extending through said perforations, and thus the castings are prevented from moving longitudinally on the under sides of the arms 5 when the moldboards are drawn through the ground. The flanges 23 on opposite sides of the grooves 22 extend up above the upper face of the frame and are perforated to allow the holding-pins 24 to be inserted. These when lying in said perforations extend across the upper face of the arms 5 and hold the casting and the mold boards or plates attached thereto firmly and securely in place.

I prefer to make the center bar 2 reversible in its relation to the flaring or inclined arms 5, and the mold boards or plates carried thereby, so that the pointed end of the series of cultivating-teeth or the point of the moldboards may be reversed in their relations to the handle and said center bar. In this case the pivot 4 forms, with the thumb-nut thereon, a clamp similar to the clamp 7. The carrier for the wheel may be fastened upon the end of the center bar by a pin 25, as in Figs. 6 and 7.

In the modification shown in Figs. 8 and 9 the tool or implement consists of a center bar 26, having a shank 27, for the attachment of a handle thereto and is provided with a member 28, to which may be secured a hoe-blade 30. Pivotally connected at 31 to the under face of the said bar 26 are a pair of tooth or tine carrying members 32 and 33, the said members being respectively provided with the arc-shaped or segmental portions 34 and 35, which are arranged to slide upon each other and in a guide or yoke 36, substantially as shown in Fig. 9 of the drawings. The said guide or yoke 36 is fixed upon the under face of the member or center bar 26 by bolts or rivets 37, and the parts are rigidly retained in their adjusted positions by means of a thumb or set screw 38, as shown. When the implement is to be used as a horse-rake or cultivator, as shown in Figs. 10 and 11, the said center bar 26 is provided with suitable handles 39 in place of the shank 27 and with a yoke 40 and wheel 41, a clevis or hook 42 being secured to the said bar 26 for attachment of horse to the device. The arc-shaped portions or members 34 and 35 of the tine or tooth carrying members are slotted, as at 43, and are respectively provided with the gear-teeth 44 and 45. Upon a spindle 46 is secured a pinion 47, having its gear-teeth in mesh with the said teeth 44 and 45 of the members 34 and 35, respectively. To operate the spindle 46 and pinion 47, a bevel-gear 48 is secured to the upper portion of said spindle 46, the same being driven from a bevel wheel or pinion 49, having its gear-teeth in mesh with the teeth of the bevel wheel or gear 48. The pinion 49 is secured upon a rod 50, which is rotatively arranged in suitable bearings 51 and 52 and is actuated by means of a crank 53 or other suitable means, as will be clearly understood from an inspection of Figs. 10 and 11 of the drawings.

The advantages obtained from the adjustable arrangement of the various parts of the previously-described cultivating tools or implements are many and are clearly evident and need not, therefore, be further dwelt upon at this time.

In operating the implement or device shown in the said Figs. 1 to 8, inclusive, the workman grasps the handle as he would that of a rake or hoe and draws or pushes the cultivating-teeth and the pointed moldboard through the ground, the device shown in Figs. 10 and 11 being pulled or drawn by horse in the manner of a horse-rake or harrow.

I am aware that changes may be made in the various arrangements and combinations of the parts, as well as in the details of the construction of the same without departing from the scope of my present invention. Hence I do not limit my invention to the exact arrangements and combinations of the parts as described in the foregoing specification, and as illustrated in the accompanying drawings, nor do I confine myself to the exact details of the construction of the said parts.

Having thus described my invention, what I claim is—

1. The combination with the hand-cultivator having series of cultivating-teeth flaring from the longitudinal central axis of the cultivator, and a central handle, of moldboards or shares arranged on the outer sides of said series of teeth and removable therefrom, meeting at the angle formed by the series and extending along the outer sides of said teeth covering the same, substantially as for the purposes set forth.

2. The combination with the handled cultivating-tool having flaring series of cultivating-teeth, of flaring moldboards arranged and secured upon the outer sides of some of the teeth and meeting at the angle formed thereby said moldboards being held from displacement by said cultivating-teeth, substantially as set forth.

3. The combination with the handled center bar, the flaring and toothed arms 5, 5, the slotted arms 8, 8, and the clamps 4, 7, admitting a reversal of the center bar and handle with respect to the flaring arms, substantially as set forth.

4. The combination, with the center bar having cultivating-arms provided with teeth 16, a handle at one end arranged at an obtuse angle in elevation and in line therewith in plan, and at the end opposite said handle having forks, of an interchangeable part separably secured in said fork, substantially as set forth.

5. In combination with the cultivator having teeth, the moldboards having castings with perforations or openings for said teeth, and means for holding said casting on said cultivator, substantially as set forth.

6. In combination with the cultivator having flaring and toothed arms 5, of grooved castings having moldboards secured thereto, the arms being held in said grooves, substantially as set forth.

7. The combination with the hand-cultivator having a handle, a center bar in line with said handle and in elevation at an obtuse angle thereto, said handle being secured at one end of said center bar, of flaring arms at the opposite sides of said center bar and having cultivating-teeth, said flaring arms having overlapping members for adjustment of the flaring arms for changing the relative positions of the cultivator-teeth, and means for securing said overlapping members in their adjusted positions upon said center bar, substantially as set forth.

In testimony that I claim the invention set forth above I have hereunto set my hand this 11th day of January, 1905.

GEORGE F. HALL.

Witnesses:
    FREDK. C. FRAENTZEL,
    GEO. D. RICHARDS.